(12) United States Patent
Marty et al.

(10) Patent No.: US 7,625,667 B2
(45) Date of Patent: Dec. 1, 2009

(54) BATTERY BOX ASSEMBLY

(75) Inventors: Garry Robin Marty, Fishers, IN (US); Timothy Jay Sailors, Jr., Fishers, IN (US); Jeffrey Lee Moore, Franklin, IN (US)

(73) Assignee: Masco Corporation of Indiana, Indianapolis, IN (US)

( * ) Notice: Subject to any disclaimer, the term of this patent is extended or adjusted under 35 U.S.C. 154(b) by 779 days.

(21) Appl. No.: 11/324,901

(22) Filed: Jan. 4, 2006

(65) Prior Publication Data

US 2006/0201558 A1    Sep. 14, 2006

Related U.S. Application Data

(60) Provisional application No. 60/661,981, filed on Mar. 14, 2005.

(51) Int. Cl.
*G05D 16/06*    (2006.01)

(52) U.S. Cl. .......................... 429/179; 429/97; 429/151; 429/153; 429/163; 251/129.1; 251/129.04; 251/129.01; 137/613

(58) Field of Classification Search ................. 429/151, 429/157, 163, 164, 168, 179
See application file for complete search history.

(56) References Cited

U.S. PATENT DOCUMENTS

| 4,137,671 | A | * | 2/1979 | Miller ........................... 49/417 |
| 5,169,118 | A | | 12/1992 | Whiteside |
| 5,224,509 | A | | 7/1993 | Tanaka et al. |
| 5,555,907 | A | | 9/1996 | Philipp |
| 5,586,746 | A | | 12/1996 | Humpert et al. |
| 5,611,517 | A | | 3/1997 | Saadi et al. |
| 5,618,023 | A | | 4/1997 | Eichholz et al. |
| 5,758,688 | A | | 6/1998 | Hamanaka et al. |
| 5,918,855 | A | | 7/1999 | Hamanaka et al. |
| 5,988,588 | A | * | 11/1999 | Allen et al. ............. 251/129.04 |
| 6,010,804 | A | * | 1/2000 | Barksdale .................... 429/178 |
| 6,025,086 | A | * | 2/2000 | Ching .......................... 429/82 |
| 6,058,356 | A | * | 5/2000 | Swanson et al. .............. 702/99 |
| 6,082,407 | A | | 7/2000 | Paterson et al. |
| 6,273,394 | B1 | | 8/2001 | Vincent et al. |
| 6,962,168 | B2 | | 11/2005 | McDaniel et al. |
| 6,968,860 | B1 | | 11/2005 | Haenlein et al. |
| 2004/0032335 | A1 | * | 2/2004 | Parrish ....................... 340/628 |
| 2005/0150556 | A1 | | 7/2005 | Jonte |
| 2005/0151101 | A1 | | 7/2005 | McDaniel et al. |

FOREIGN PATENT DOCUMENTS

| JP | 2181361 | 7/1990 |
| JP | 10026243 | 1/1998 |
| JP | 10311070 | 11/1998 |
| JP | 2002129613 | 5/2002 |

* cited by examiner

*Primary Examiner*—Dah-Wei D Yuan
*Assistant Examiner*—Amanda Barrow
(74) *Attorney, Agent, or Firm*—Baker & Daniels LLP

(57) ABSTRACT

A battery compartment assembly includes a housing and a lid configured to be removably attached to the housing. The lid includes a pair of hinges that engage a corresponding pair of openings in the housing, and a latch that engages a ridge on the housing when the lid is in the closed position. The lid also includes a pair of contacts that extend from the lid to mate with connectors of a control unit to be powered by the batteries in the assembly. A spring is included in the housing for connecting to a positive terminal of a first battery and a negative terminal of a second battery.

10 Claims, 13 Drawing Sheets

text truncated, not processable as image-only …

BATTERY BOX ASSEMBLY

CROSS-REFERENCE TO RELATED APPLICATIONS

This application claims the benefit of U.S. Provisional Application No. 60/661,981, filed Mar. 14, 2005, which is expressly incorporated by reference herein.

This application also expressly incorporates by reference the disclosure of each of the following applications: (1) U.S. patent application Ser. No. 10/755,581, filed Jan. 12, 2004, titled "MULTI-MODE HANDS FREE AUTOMATIC FAUCET," (2) U.S. patent application Ser. No. 10/755,582, filed Jan. 12, 2004, titled "CONTROL ARRANGEMENT FOR AN AUTOMATIC RESIDENTIAL FAUCET," (3) U.S. patent application Ser. No. 10,757,316, filed Jan. 14, 2004, now U.S. Pat. No. 6,962,168, titled "CAPACITIVE TOUCH ON/OFF CONTROL FOR AN AUTOMATIC RESIDENTIAL FAUCET," (4) U.S. patent application Ser. No. 10/912,254, filed Aug. 5, 2004, now U.S. Pat. No. 6,968,860, titled "RESTRICTED FLOW HANDS-FREE FAUCET," (5) U.S. Provisional Patent Application Ser. No. 60/661,982, filed Mar. 14, 2005, titled "POSITION-SENSING DETECTOR ARRANGEMENT FOR CONTROLLING A FAUCET," (6) U.S. Provisional Patent Application Ser. No. 60/662,106, filed Mar. 14, 2005, titled "VALVE BODY ASSEMBLY WITH ELECTRONIC SWITCHING," and (7) U.S. Provisional Patent Application Ser. No. 60/662,107, filed Mar. 14, 2005, titled "SPOUT ASSEMBLY FOR AN ELECTRONIC FAUCET AND METHOD FOR PROVIDING STRAIN RELIEF OF A CABLE" ("Related Applications"). It is understood that certain features disclosed and/or claimed in one or more of the Related Applications may be combined and/or claimed in combination with certain features disclosed in this application.

BACKGROUND AND SUMMARY OF THE INVENTION

The present invention generally relates to compartments for housing batteries, and more particularly to a battery compartment configured to be detachable from the powered electronics to facilitate replacement of the batteries.

Battery compartments typically house batteries which are electrically coupled to electronic components and provide electrical power thereto. Many conventional battery compartments are difficult to access, particularly when the electronics are installed such that they are not visible in ordinary circumstances. For example, a control box for an electronic faucet may be mounted under the sink. When a conventional battery compartment is used and the batteries housed therein need to be replaced, the user typically must open a lid of the battery compartment, remove the old batteries, and install the new batteries, all while remaining in the small, difficult to access, poorly-lit space under the sink.

An illustrative embodiment of the present disclosure provides a battery compartment that is detachable from a housing of a control unit and is configured to support batteries for powering the control unit. In one illustrative embodiment, a battery compartment for use in combination with the control unit of an electronic faucet includes a housing configured to receive a first battery and a second battery. A lid including a hinge is operably coupled to the housing. A first contact is configured to contact a negative terminal of the first battery, and a second contact is configured to contact a positive terminal of the second battery. The first and second contacts extend from the lid to mate with first and second connectors of the control unit. A spring is disposed within the housing and includes a first coil configured to be in electrical communication with a positive terminal of the first battery, and a second coil configured to be in electrical communication with a negative terminal of the second battery. The spring also includes a connecting portion connecting the first and second coils of the spring.

In a further illustrative embodiment, a battery compartment for use in combination with the control unit of an electronic faucet includes a housing having a lower wall, a rear wall, and a front wall defining an interior space for receiving at least one battery. A contact extends in a rearward direction relative to the rear wall of the housing and is configured to be in electrical communication with the at least one battery. The housing is supported by the control unit such that the rear wall of the housing is juxtaposed relative to a front wall of the control unit, and the contact is in electrical communication with a connector of the control unit.

According to another illustrative embodiment, a controller assembly for an electronic faucet includes a control unit having a housing with a front wall and a rear wall defining an interior space for receiving electronics. A connector is in electrical communication with the electronics. A first coupler is supported by the rear wall of the control unit and is configured to attach the control unit to a support below a sink. A battery compartment includes a housing having a lower wall, a rear wall, and a front wall defining an interior space for receiving at least one battery. A second coupler is supported by the rear wall of the battery compartment and is configured to operably couple with the front wall of the control unit such that the battery compartment is supported by, and in electrical communication with, the control unit.

The features and advantages of the present invention described above, as well as additional features and advantages, will be readily apparent to those skilled in the art upon reference to the following description and the accompanying drawings.

DETAILED DESCRIPTION OF EMBODIMENTS OF THE INVENTION

The embodiments described below are merely exemplary and are not intended to limit the invention to the precise forms disclosed. Instead, the embodiments were selected for description to enable one of ordinary skill in the art to practice the invention.

Figure 1:
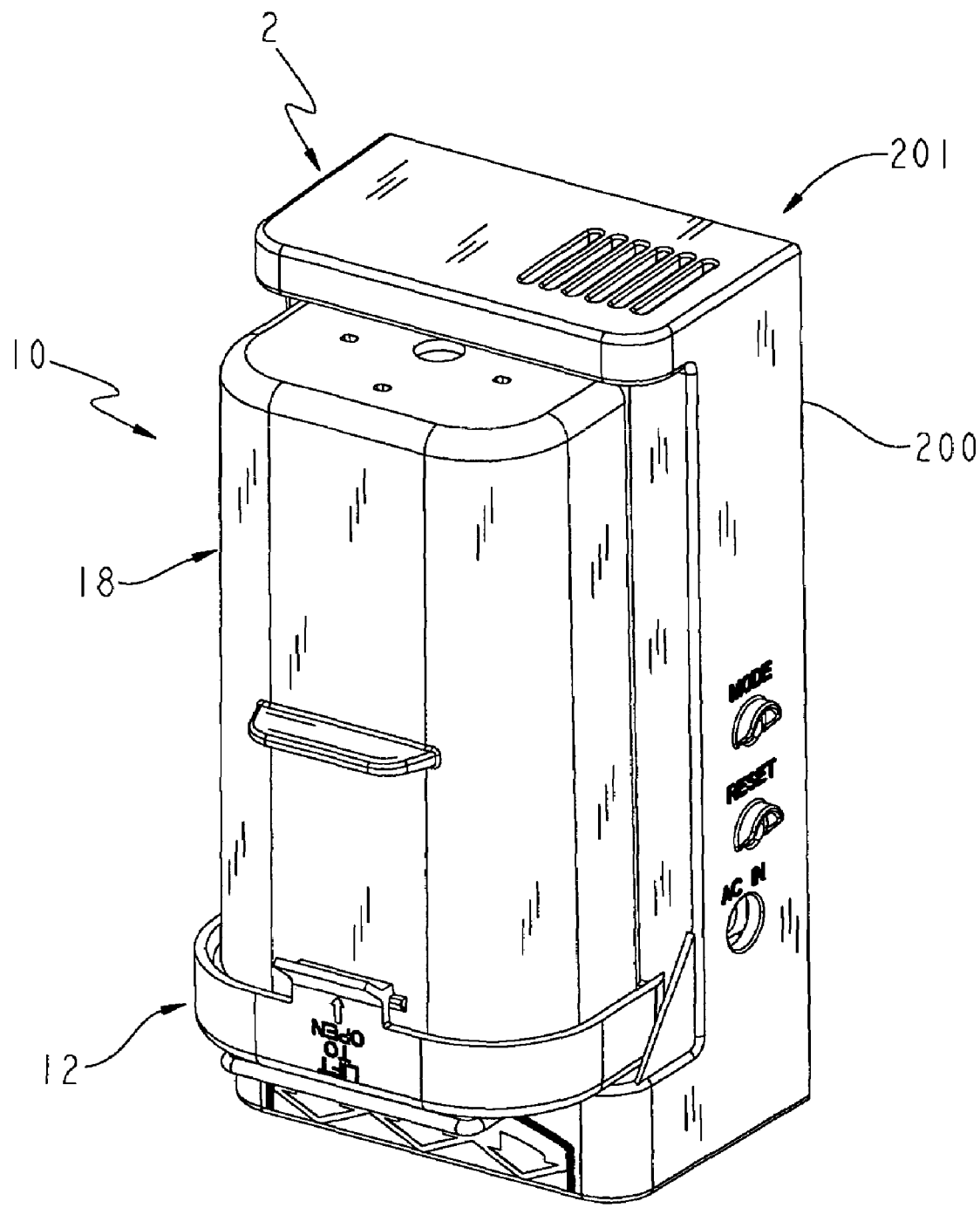
FIG. 1 is a front perspective view of an illustrative embodiment controller assembly showing a battery compartment coupled to a control unit.
Figure 2:
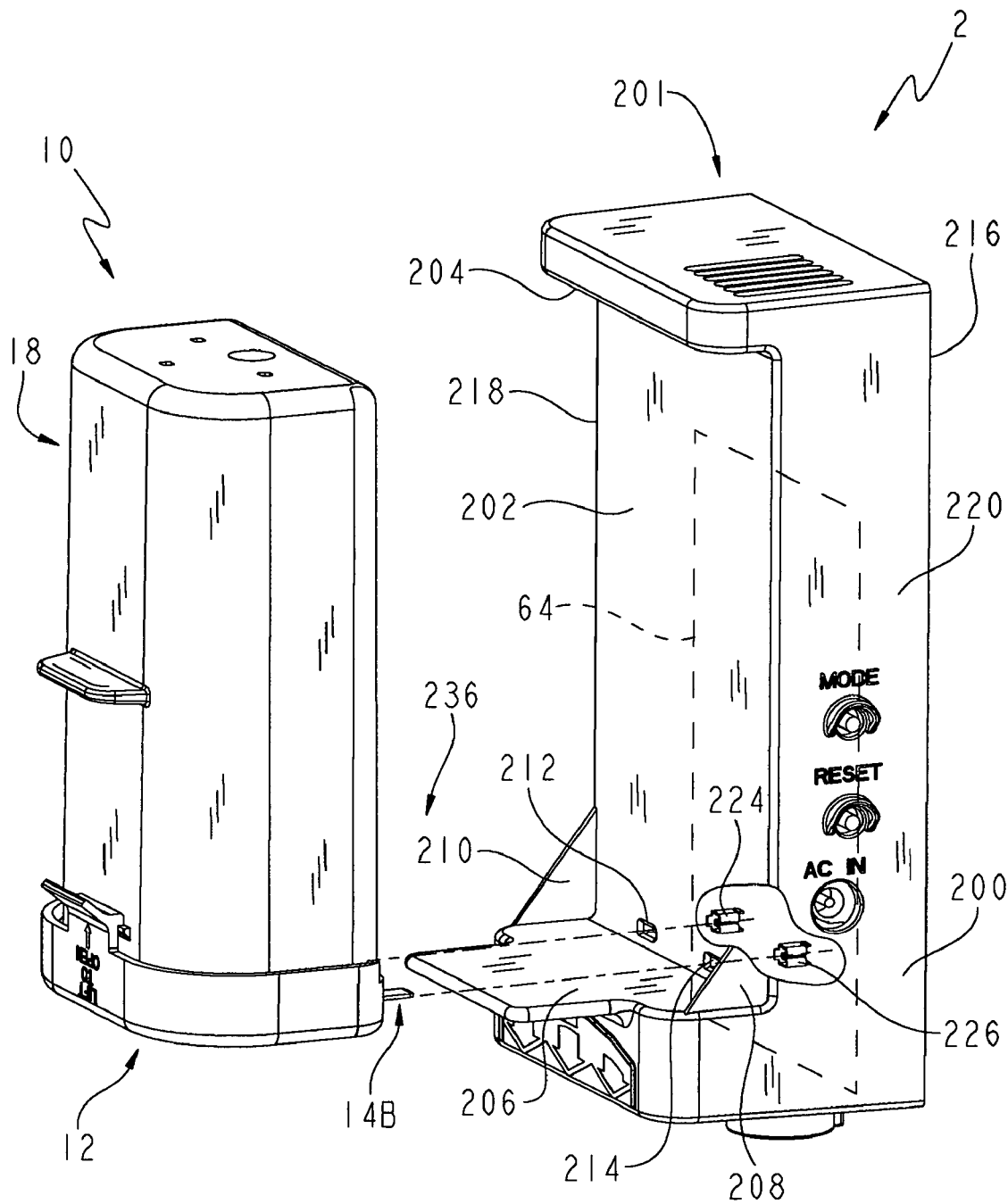
FIG. 2 is a partially exploded perspective view, with a partial cut-away, of the controller assembly of FIG. 1, showing the battery compartment uncoupled from the control unit.
Figure 4:
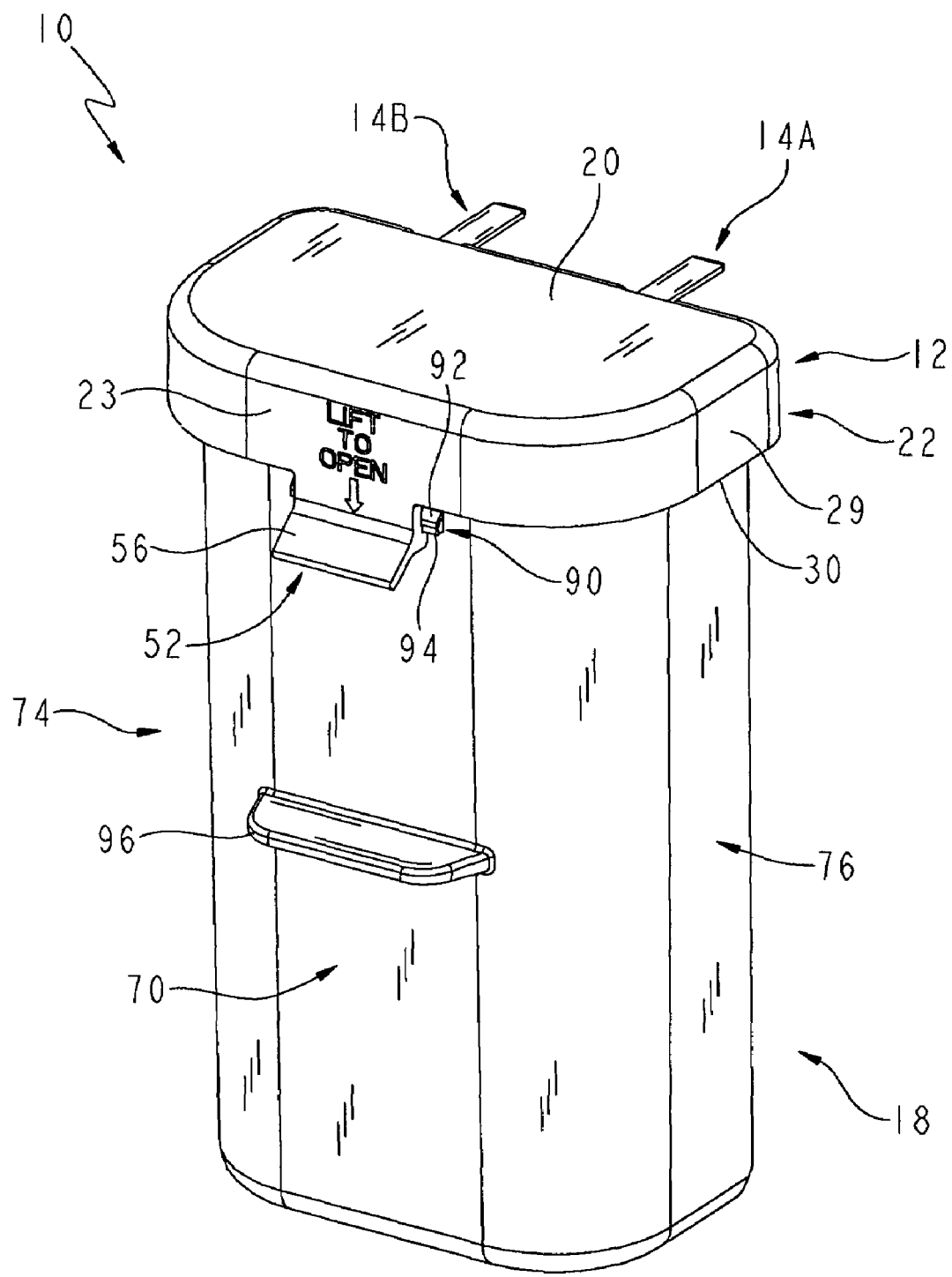
FIG. 4 is a top perspective view of the battery compartment of FIG. 1, showing a lid coupled to a housing.
Figure 5:
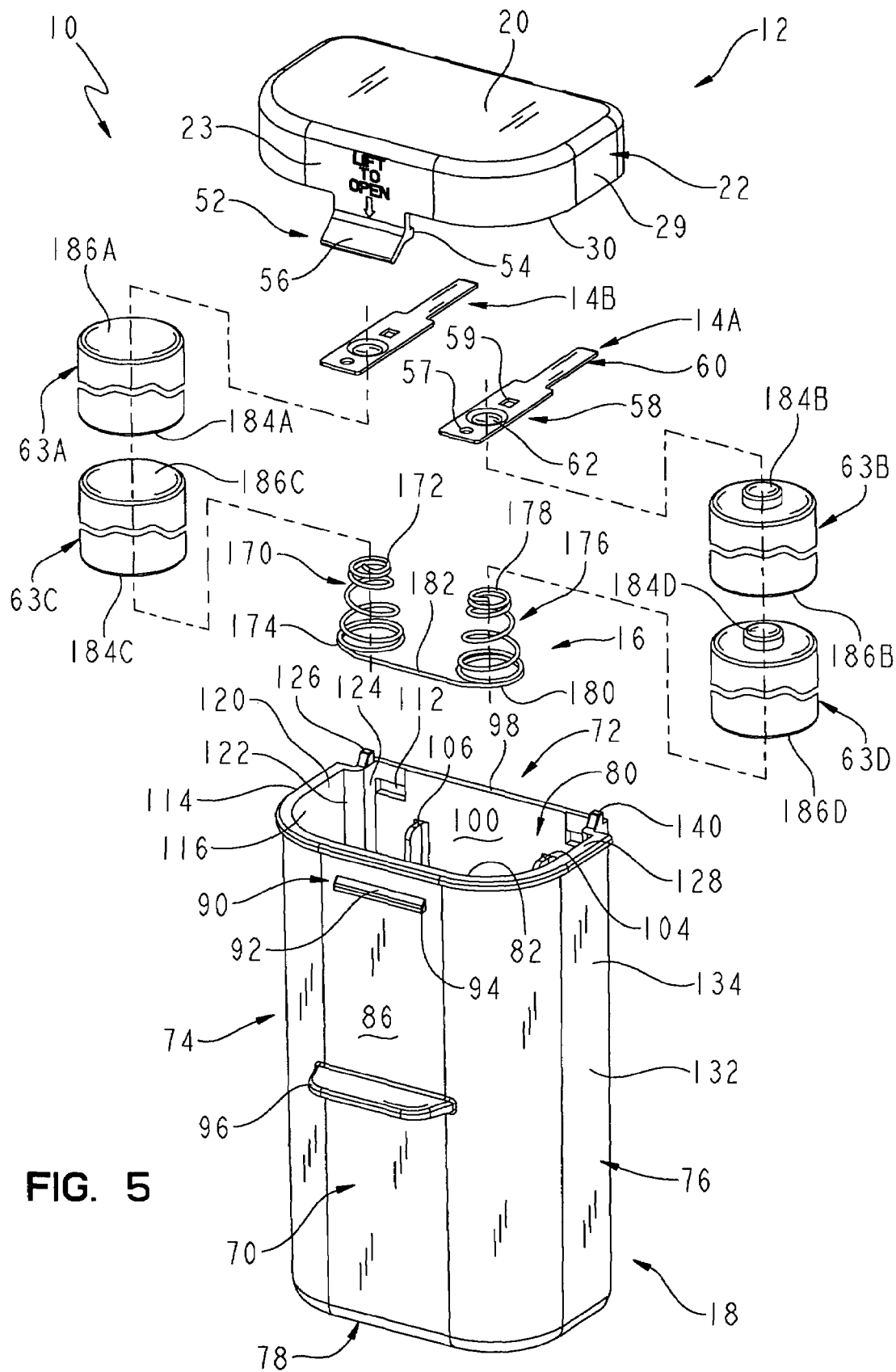
FIG. 5 is an exploded perspective view of the battery compartment of FIG. 4.

Referring initially to FIGS. 1 and 2, a controller assembly 2 illustratively includes a battery compartment 10 operably coupled to a control unit 201. Battery compartment 10 according to one embodiment of the present invention generally includes a lid 12, a first contact 14A, a second contact 14B, a spring 16, and a housing 18 (FIG. 5). As best shown in FIGS. 4, 5, 10, and 11, lid 12, which is formed of a non-conductive material, includes an upper wall 20 and a side wall 22 which together substantially define an interior space 24. Upper wall 20 includes four pins 26A-26D that are spaced and sized to secure contacts 14A, 14B to lid 12 as is further described below. Side wall 22 extends about the perimeter of the upper wall 20 and includes a front portion 23, a rear portion 25, side portions 27, 29, a mating edge 28 on rear portion 25 and a lower edge 30 on front portion 23 and side portions 27, 29. Extending up from rear portion 25 of side wall 22 are a pair of hinges 32, 34. Each hinge 32, 34 includes a vertical portion 36 and a horizontal portion 38 that projects from vertical portion 36 substantially over mating edge 28. Horizontal portions 38 each include a contact surface 40.

Figure 7:
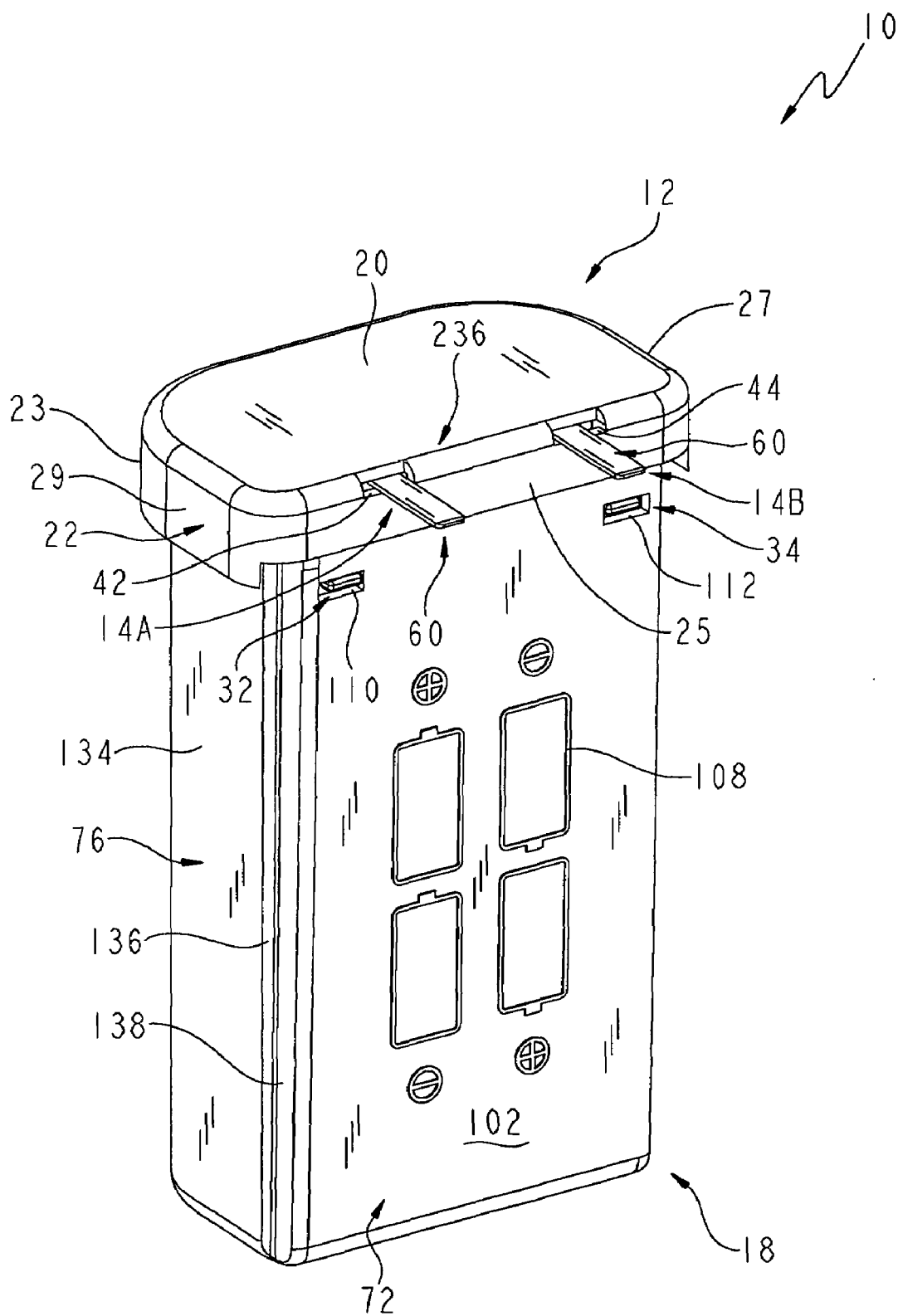
FIG. 7 is a rear perspective view of the battery compartment of FIG. 4.
Figure 11:
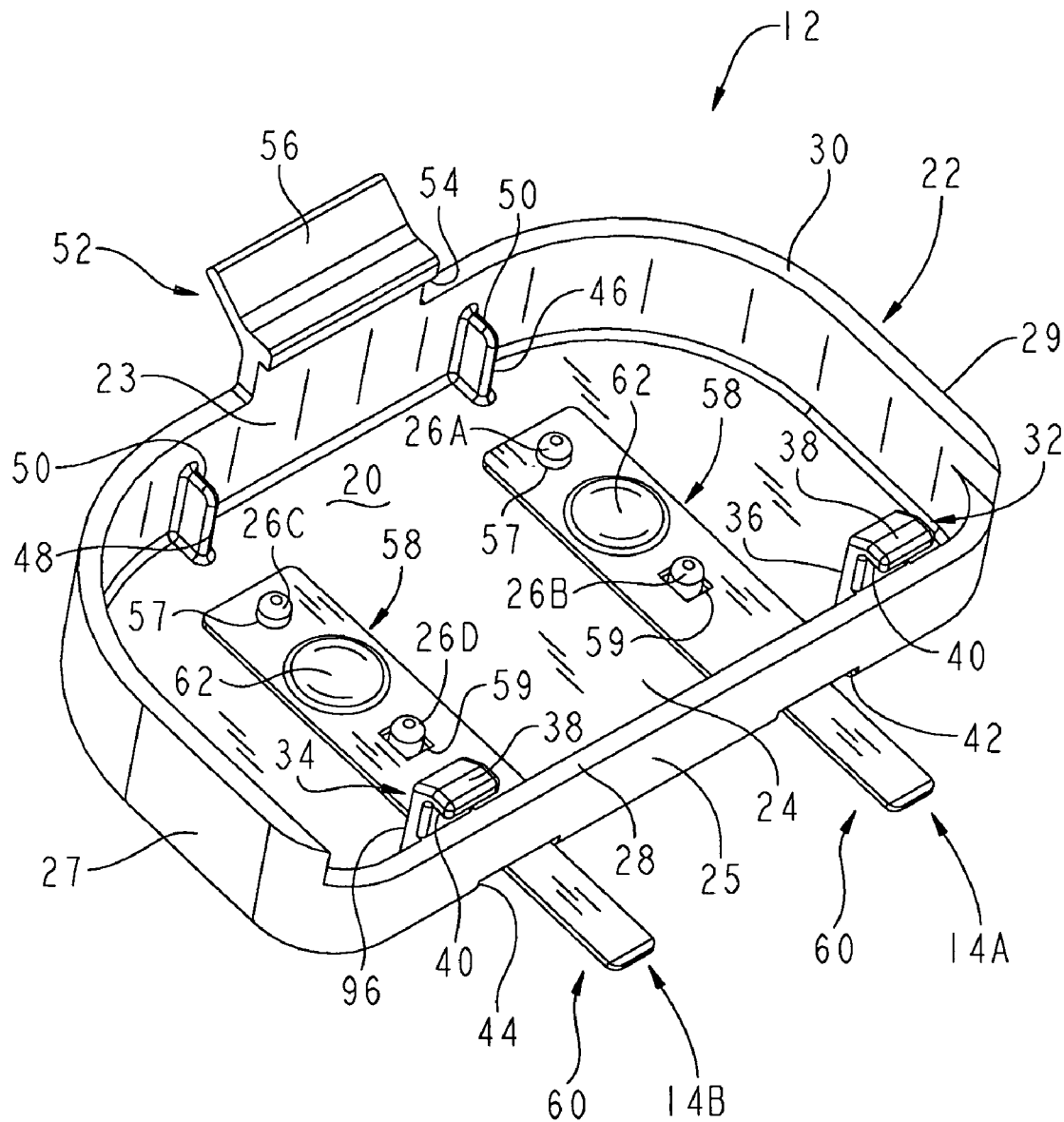
FIG. 11 is a bottom perspective view of the lid of the battery compartment of FIG. 4.
Figure 12:
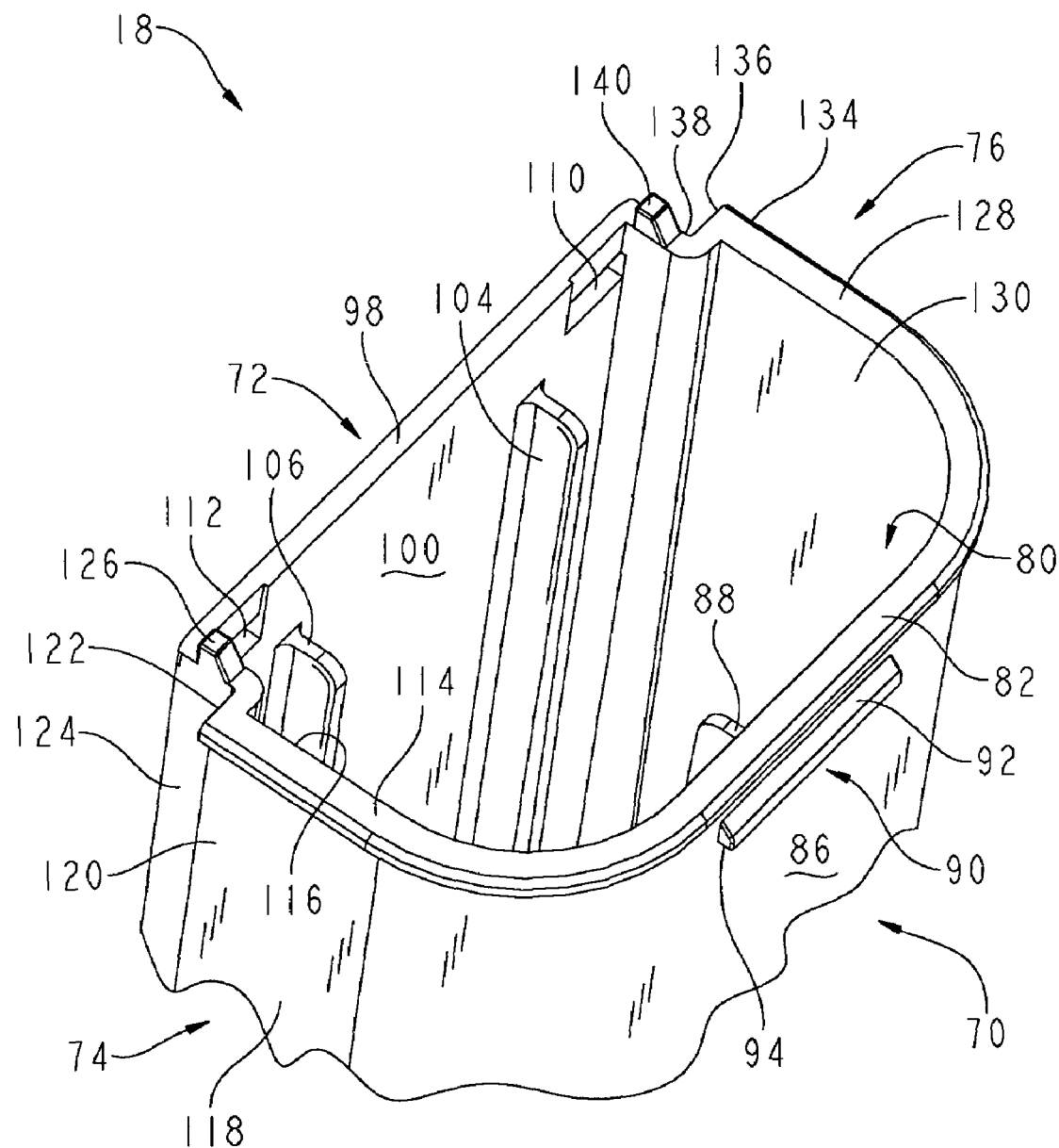
FIG. 12 is a partial top perspective view of the housing of the battery compartment of FIG. 4.

As shown in FIGS. 7 and 11, a pair of openings 42, 44 for receiving portions of contacts 14A, 14B are formed substantially at the intersection between upper wall 20 and rear portion 25 of side wall 22 adjacent hinges 32, 34. A pair of stand-offs 46, 48 extend from upper wall 20 along front portion 23 of side wall 22 (FIG. 11). Each stand-off 46, 48 includes an upper surface 50. Finally, lid 12 further includes a latch 52 extending from front portion 23 of side wall 22. Latch 52 includes a catch ridge 54 and a handle 56.

First and second contacts 14A and 14B are substantially identical. Accordingly, only contact 14A is referenced in detail in the following description. With further reference to FIGS. 5 and 11, contact 14A is made of a conductive material, and includes a body 58 and a tab 60. Body 58 includes a pair of openings 57, 59 (FIG. 11) that are spaced and sized to correspond to the spacing and size of pins 26A, 26B. Body 58 also includes a dome 62 configured to make contact with a battery 63 as is further described below. It should be understood that dome 62 protrudes from body 58 a distance that is greater than the distance pins 26A, 26B protrude from upper wall 20 to ensure that contact 14A makes electrical contact with the battery 63. Tab 60 extends from body 58 and is narrower than body 58. As further detailed herein, tab 60 is configured to be in electrical communication with electronics 64 of control unit 201 and complete an electrical circuit, so that batteries 63 housed by battery compartment 10 provide power to the electronics 64.

Figure 8:
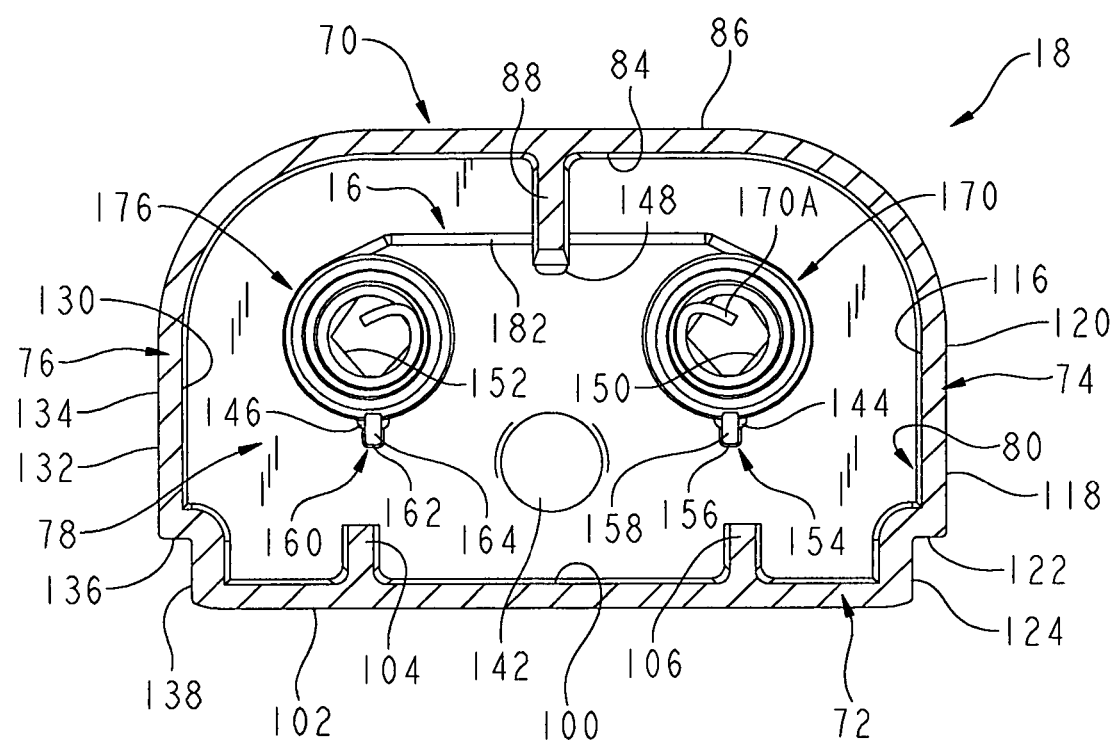
FIG. 8 is a cross-sectional view taken substantially along line 8-8 of FIG. 6.
Figure 9:
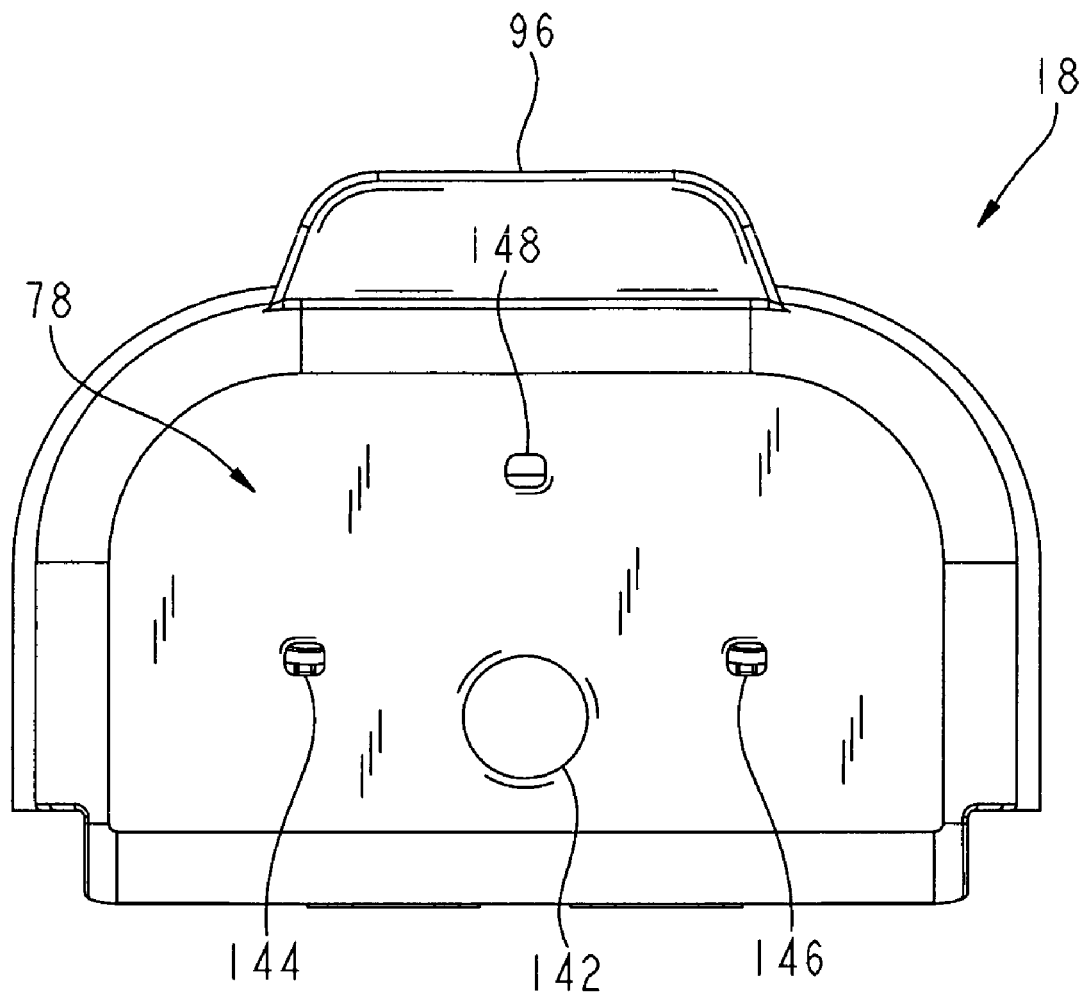
FIG. 9 is a bottom plan view of the battery compartment of FIG. 4.
Figure 10:
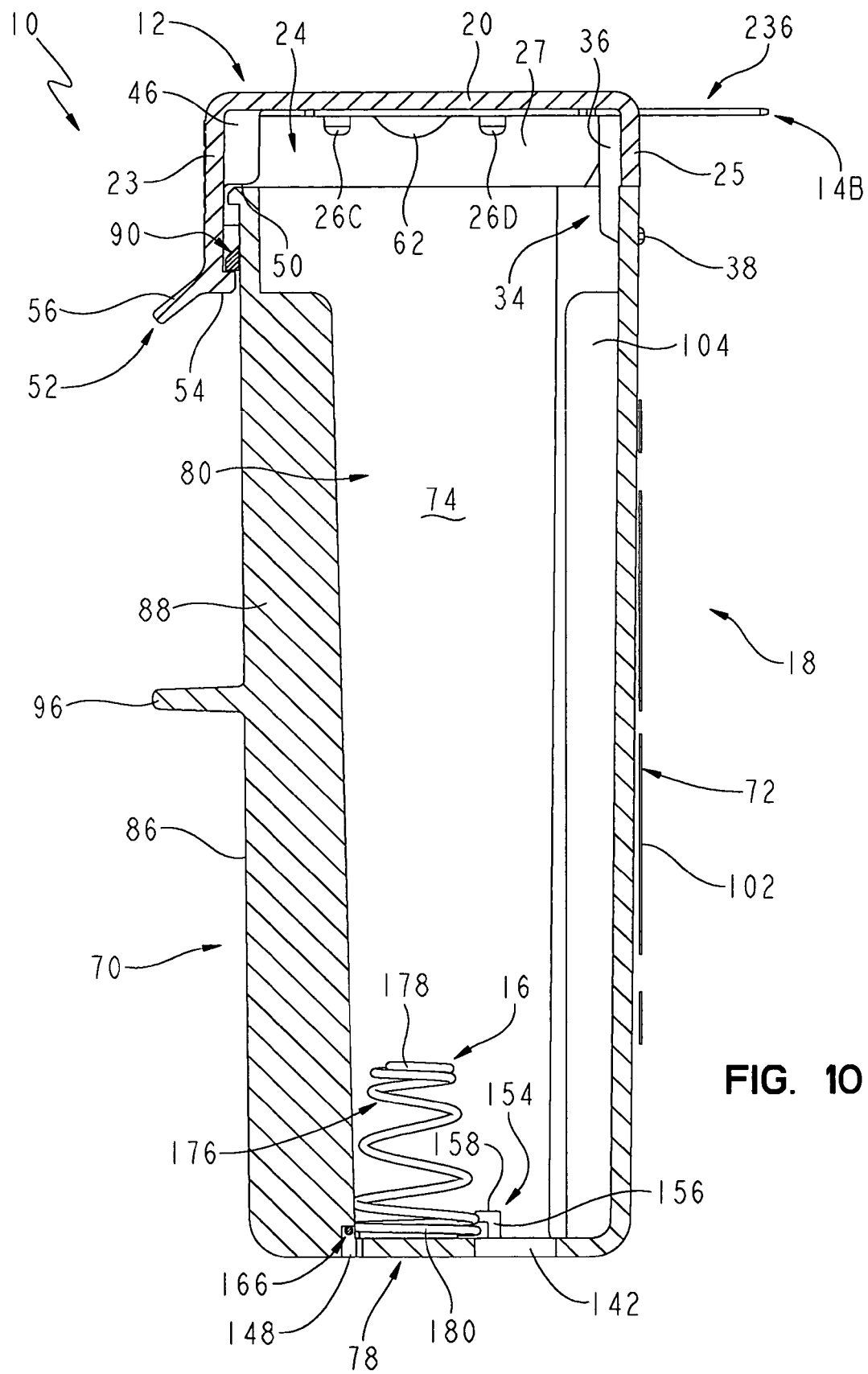
FIG. 10 is a cross-sectional view taken substantially along line 10-10 of FIG. 6.

Referring now to FIGS. 4-10 and 12, housing 18 is formed of a non-conductive material and generally includes a front wall 70, a rear wall 72, side walls 74, 76, and a lower wall 78, which together substantially define an interior space 80 for receiving batteries 63. Front wall 70 includes an upper edge 82, an inner surface 84, and an outer surface 86. A rib 88 extends substantially longitudinally along inner surface 84 from adjacent upper edge 82 to lower wall 78. A laterally extending ridge 90 projects from outer surface 86 and includes a cam surface 92 and a retaining surface 94 (FIG. 10). Additionally, a grip member or wall 96 (FIG. 10) projects substantially perpendicularly from outer surface 86 of front wall 70.

Rear wall 72 includes an upper edge 98, an inner surface 100, and an outer surface 102. A pair of ribs 104, 106 extend substantially longitudinally along inner surface 100 from adjacent upper edge 98 to lower wall 78. A battery orientation diagram 108 (FIG. 7) is formed, imprinted, or otherwise indicated on outer surface 102. A pair of openings 110, 112 are formed through rear wall 72 adjacent upper edge 98 for receiving hinges 32, 34 as is further described below.

Side wall 74 includes an upper edge 114, an inner surface 116, and an outer surface 118. As shown, side wall 74 also includes a first portion 120, a second portion 122 that is substantially perpendicular to first portion 120, and a third portion 124 that is substantially parallel to first portion 120. A lug 126 extends upwardly from upper edge 114 of third portion 124. Similar to side wall 74, side wall 76 includes an upper edge 128, an inner surface 130, an outer surface 132, a first portion 134, a second portion 136, a third portion 138, and a lug 140.

Referring now to FIGS. 6 and 8-10, lower wall 78 includes a drain opening 142, a first access opening 144, a second access opening 146, a third access opening 148, a first positioning member or ridge 150 adjacent first access opening 144, and a second positioning member or ridge 152 adjacent second access opening 146. As best shown in FIGS. 8 and 9, a retention prong 154 is disposed adjacent first access opening 144 and includes a vertical portion 156 that extends substantially perpendicularly from lower wall 78, and a horizontal portion 158 that extends substantially parallel to lower wall 78, partially over first access opening 144. Another retention prong 160 is similarly disposed relative to second access opening 146. Retention prong 160 is substantially identical to retention prong 154 and, as such, includes vertical portion 162 and horizontal portion 164. Finally, rib 88 forms a notch 166 (FIG. 10) adjacent third access opening 148.

As best shown in FIGS. 5 and 8, spring 16 is formed, in this embodiment, from a single piece of conductive material. Spring 16 includes a first coil 170 having an upper end 172 configured to contact battery 63C and a lower end 174 configured to substantially surround first positioning ridge 150. Spring 16 further includes a second coil 176 having an upper end 178 configured to contact battery 63D and a lower end 180 configured to substantially surround second positioning ridge 152. Spring 16 further includes a connecting portion 182 extending between lower end 174 of first coil 170 and lower end 180 of second coil 176 and retained within notch 166 (FIG. 10).

It should be understood that conventional battery compartments typically use a blade or clip to engage the positive terminal of a battery, which projects from the end of the battery. This clip must be connected to the negative terminal of the next battery in the series using a wire. The above-described spring 16 provides an in-turned end 170A at end 172 of first coil 170 which ensures contact with the positive terminal 184C of the battery 63C as is further described below. As first coil 170 is connected to second coil 176 by connecting portion 182, an extra component such as a wire is not needed to complete the series connection.

Assembly 10 is assembled by installing spring 16 into housing 18. Referring to FIGS. 2 and 8 through 12, spring 16 is positioned into interior space 80 of housing 18 adjacent lower wall 78. Lower end 174 of first coil 170 is positioned under horizontal portion 158 of retention prong 154, and lower end 180 of second coil 176 is positioned under horizontal portion 164 of retention prong 160. Connecting portion 182 of spring 16 is compressed toward rear wall 72 of housing 18 and positioned under and into notch 166 of rib 88. When connecting portion 182 is released, spring 16 is compressed between rib 88 and vertical portions 156, 162 of retention prongs 154, 160.

Referring now to FIGS. 7 and 11, contact 14A is connected to lid 12 by inserting tab 60 through opening 42 and pressing body 58 toward upper wall 20 of lid 12 such that pins 26A, 26B extend through openings 57, 59 (FIG. 11), respectively. Pins 26A and 26B may be deformed after installation of contact 14A to prevent removal of contact 14A. Of course, contact 14A should be installed such that dome 62 extends away from upper wall 20. Contact 14B is installed in a similar fashion.

Figure 6:
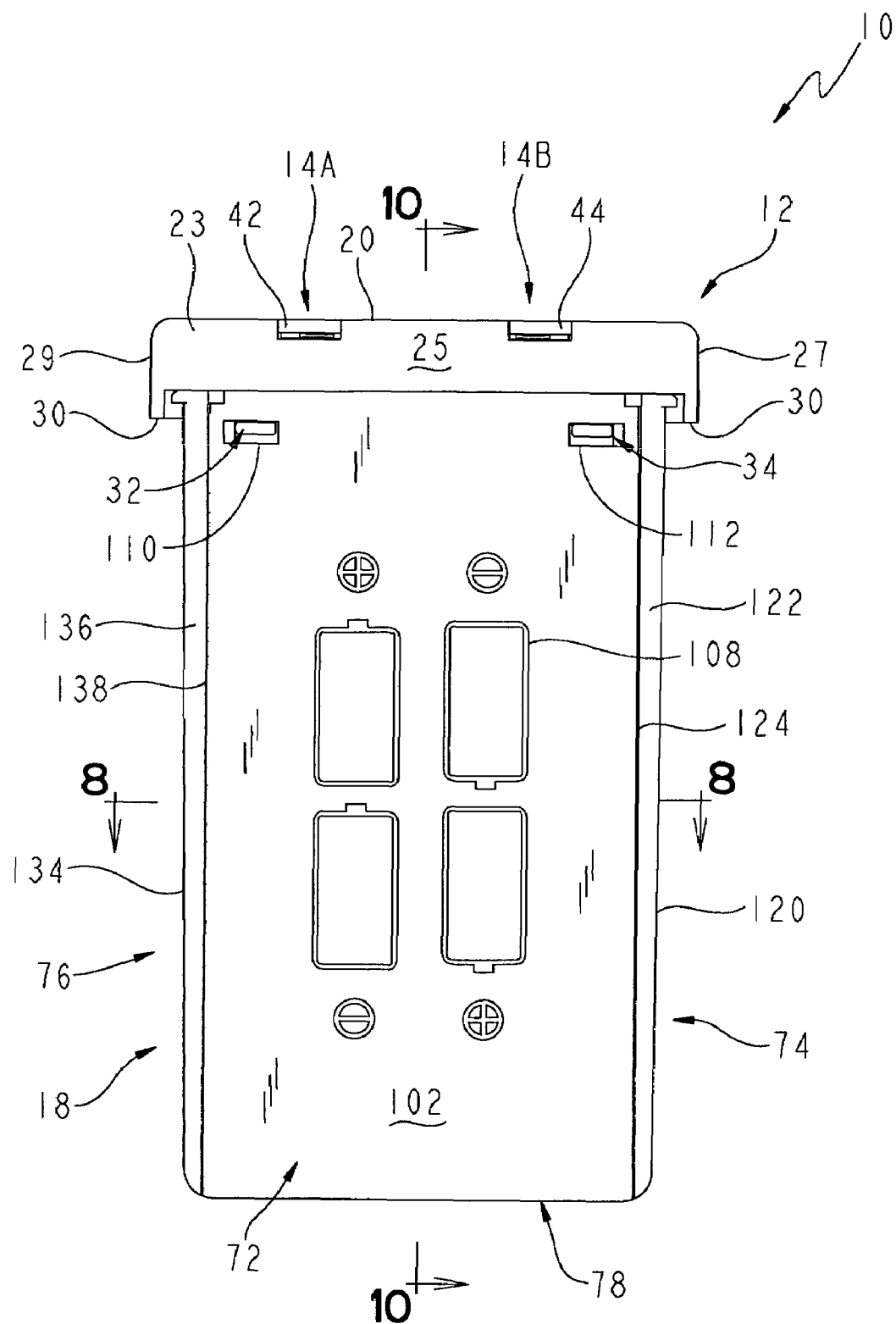
FIG. 6 is a rear elevation view of the battery compartment of FIG. 4.

Next, batteries 63 may be placed into interior space 80 of housing 18 according to diagram 108 (FIGS. 6 and 7). It should be understood that rib 88 of front wall 70 separates batteries 63A, 63C in one half of housing 18 from batteries 63B, 63D in the other half of housing 18. It should be further understood that although housing 18 is shown as configured for four batteries 63, the principles of the present invention may be applied to modify housing 18 to receive more than four batteries 63 or fewer than four batteries 63. Moreover, housing 18 may be configured to receive batteries 63 of any number or size (i.e., AA, AAA, C, and/or D-cell batteries). As indicated by diagram 108 and shown in FIG. 5, the batteries 63 are installed to form a series circuit such that when lid 12 is installed, the negative terminal or contact 186A of battery 63A touches dome 62 of contact 14B, the positive terminal or contact 184A of battery 63A touches the negative contact 186C of battery 63C, the positive contact 184C of battery 63C touches first coil 170 of spring 16, the negative contact 186D of battery 63D touches second coil 176 of spring 16, which is electrically connected to first coil 170 through connecting portion 182, the positive contact 184D of battery 63D touches the negative contact 186B of battery 63B, and the positive contact 184B of battery 63B touches dome 62 of contact 14A.

Lid 12 is attached to housing 18 by first resting mating edge 28 of lid 12 onto edge 98 of housing rear wall 72 with hinges 32, 34 aligned with openings 110, 112 of rear wall 72. Next, lid 12 is rotated downwardly toward housing 18 such that horizontal portions 38 of hinges 32, 34 extend into openings 110, 112 as shown in FIG. 7. Lugs 126, 140 prevent lid 12 from shifting toward front wall 70 as lid 12 is rotated. As indicated by FIGS. 4 and 10, as lid 12 is rotated downwardly into this closed position, catch ridge 54 of latch 52 engages cam surface 92 of ridge 90 formed on front wall 70 of housing 18. Latch 52 and lid 12 flex slightly so that catch ridge 54 passes over ridge 90. As lid 12 reaches the closed position, latch 52 and lid 12 are urged toward their original positions, and catch ridge 54 is retained under retaining surface 94 of ridge 90. Accordingly, hinges 32, 34 and catch ridge 54 substantially inhibit upward movement of lid 12.

When in the closed position, domes 62 of contacts 14A, 14B move their associated stack of batteries 63B, 63D and 63A, 63C downwardly against the upward biasing force of spring coils 176, 170. As such, each battery stack 63A, 63C and 63B, 63D is held relatively firmly in place, thereby ensuring contact between the batteries 63A, 63C and 63B, 63D, contacts 14B, 14A and coils 170, 176.

Referring again to FIGS. 1-3, a housing 200 for a control unit 201 configured to receive battery compartment assembly 10 is shown. It should be understood that housing 200 includes internal electronics 64 (FIG. 2) which are powered by the batteries 63 contained within battery compartment assembly 10, and may be mounted in a relatively inaccessible, poorly lit location such as under a sink. Among other things, housing 200 includes a front wall 202 having an upper flange 204, a lower flange 206, and a pair of alignment ribs 208, 210. A first opening 212 and a second opening 214 are formed through front wall 202 adjacent lower flange 206. A rear wall 216 and side walls 218 and 220 cooperate with front wall 202 to define an interior space for receiving electronics 64.

A first connector 224 and a second connector 226 are accessible to contacts 14A and 14B through first opening 212 and second opening 214, respectively (FIG. 2). The connectors 224 and 226 may be of conventional design and illustratively include spring biased members defining a slot to slidably receive contacts 14A and 14B, respectively.

Figure 3:
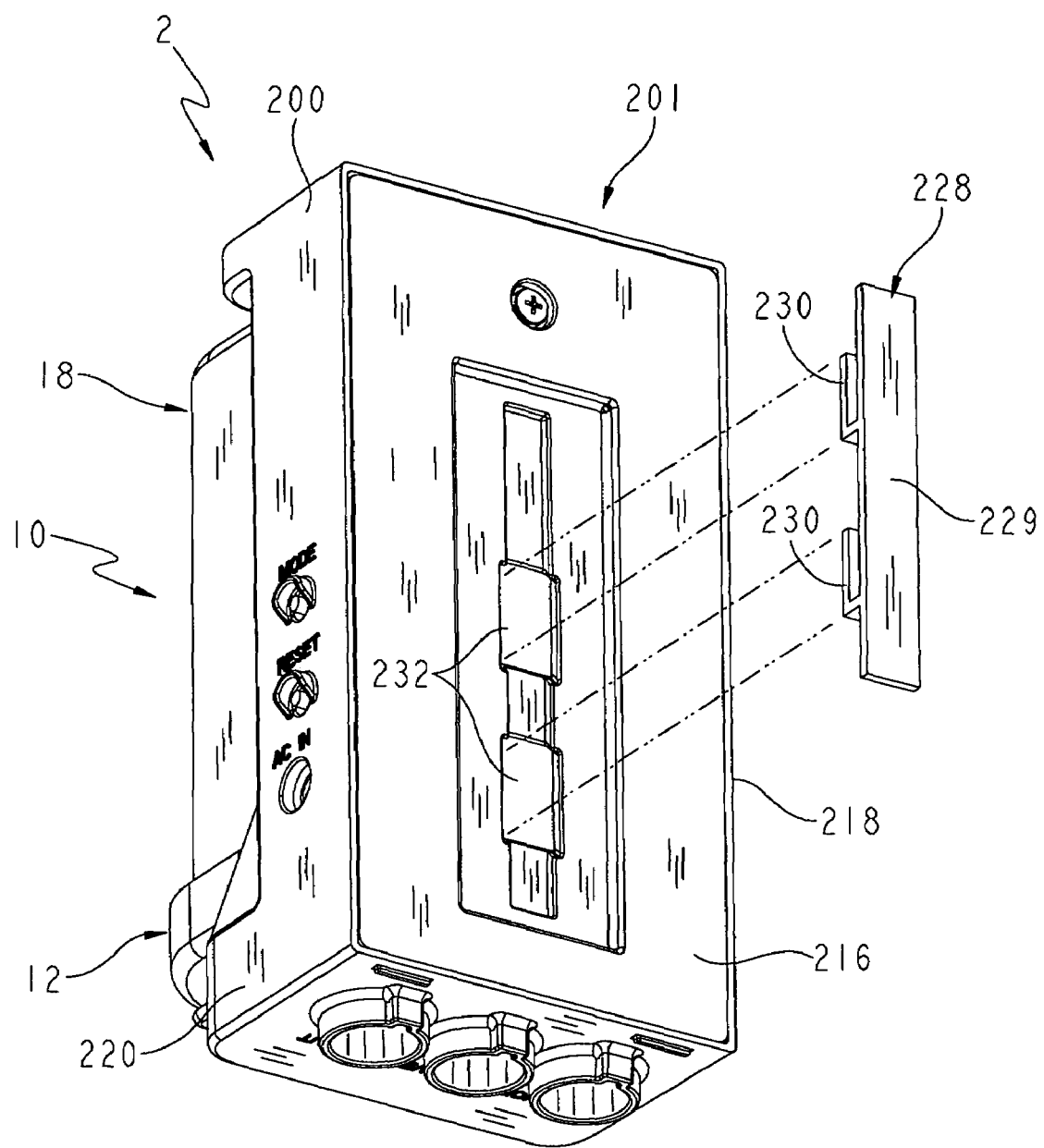
FIG. 3 is a rear perspective view of the controller assembly of FIG. 1.

With reference to FIG. 3, a first coupler 228 is illustratively supported by rear wall 216 of housing 200. In one illustrative embodiment, first coupler 228 comprises a bracket 229 including engagement members or hooks 230 configured to be releasably received within openings 232 formed in rear wall 216. Bracket 229 is illustratively fixed to a mounting surface 234 under sink (FIG. 13) for removably attaching the control unit 201 thereto.

A second coupler 236 is illustratively defined by contacts 14A and 14B. More particularly, engagement between contacts 14A, 14B and connectors 224, 226 support battery compartment 10 from control unit 201.

As should be apparent from the foregoing, battery compartment assembly 10 is installed onto housing 200 by holding assembly 10 with lid 12 facing downwardly, and inserting contacts 14A, 14B into openings 212, 214, respectively. Assembly 10 is then moved toward housing 200 such that rear wall 72 of assembly 10 is juxtaposed relative to front wall 202 of housing 200. When in the installed position, assembly 10 is illustratively positioned against front wall 202 between upper flange 204, lower flange 206, and alignment ribs 208, 210, with contacts 14A, 14B positioned substantially fully within openings 212, 214. It should be understood that when assembly 10 is in the installed position, contacts 14A, 14B engage power connectors 224, 226 within housing 200 to provide power from the batteries 63 within assembly 10.

Batteries 63 within assembly 10 may be replaced by first pulling assembly 10 out of engagement with housing 200. More specifically, the user may grasp housing 18 (or grip member 96 of housing 18) and pull housing 18 away from front wall 202 of housing 200. This causes contacts 14A, 14B to withdraw from openings 212, 214. Assembly 10 may then be taken away from housing 200 for replacement of the batteries 63. This permits the user to take assembly 10 to a well-lit area where lid 12 of assembly 10 may be easily removed. To do so, the user grasps handle 56 of latch 52 and applies force to flex latch 52 away from front wall 70 of housing 18. This permits catch ridge 54 of latch 52 to clear retaining surface 94 of ridge 90. Lid 12 is then rotated on hinges 32, 34 and moved away from housing 18 such that hinges 32, 34 withdraw from openings 110, 112 of housing rear wall 72. Housing 18 may then be turned over so that the batteries 63 within housing 18 fall out from interior space 80. New batteries 63 may be installed, and the above-described process for attaching lid 12 to housing 18 and installing assembly 10 onto housing 200 my be repeated.

Figure 13:
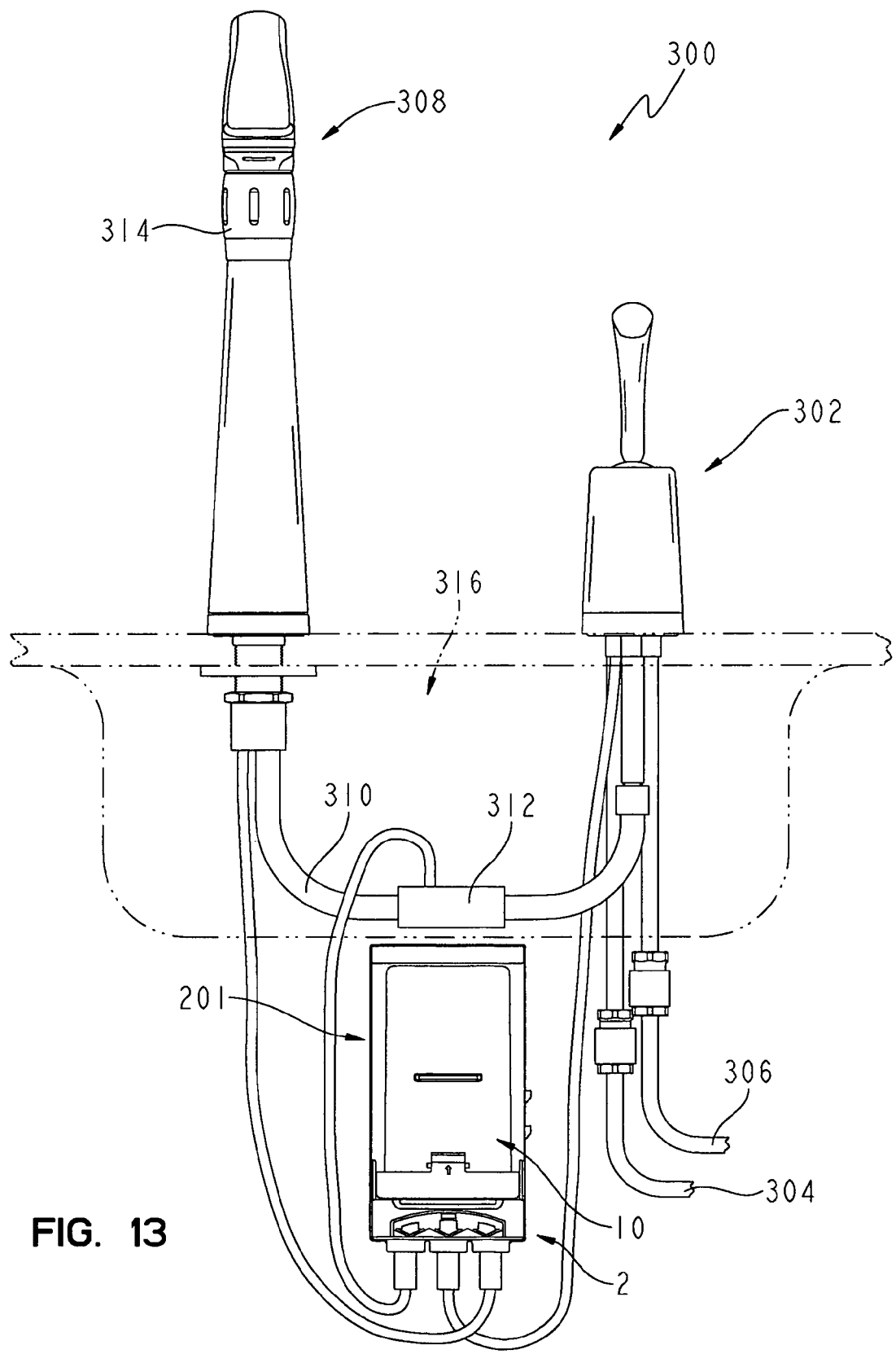
FIG. 13 is a front plan view of the controller assembly of FIG. 1 positioned below a sink deck and coupled to a valve body assembly and a spout assembly.

With reference to FIG. 13, controller assembly 2, including battery compartment 10 and control unit 201, may be used in combination with an electronic faucet 300. Electronic faucet 300 illustratively includes a valve body assembly 302 in electrical communication with control unit 201, and configured to receive hot and cold water from hot and cold water supply lines 304 and 306. Additional details of the valve body assembly 302 are provided in one or more of the Related Applications, including U.S. Provisional Patent Application Ser. No. 60/662,106, filed Mar. 14, 2005, titled "VALVE BODY ASSEMBLY WITH ELECTRONIC SWITCHING."

Hot and cold water is illustratively mixed within valve body assembly 302 and then supplied to a spout assembly 308 through a mixed water line 310. An electrically actuated valve, such as a solenoid valve 312, may be positioned within mixed water line 310 intermediate valve body assembly 302 and spout assembly 308 and is controlled by control unit 201. Spout assembly 308 is in electrical communication with control unit 201 and dispenses mixed water through a spray head 314 and into a sink 316. Additional details of spout assembly 308 are provided in one or more of the Related Applications, including U.S. Provisional Patent Application Ser. No. 60/662,107, filed Mar. 14, 2005, titled "SPOUT ASSEMBLY FOR AN ELECTRONIC FAUCET AND METHOD FOR PROVIDING STRAIN RELIEF OF A CABLE."

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

The invention claimed is:

1. A battery compartment for use in combination with a control unit of an electronic faucet, including:
   a housing configured to receive a first battery and a second battery;
   a lid having a hinge operably coupled to the housing, a first contact configured to contact a negative terminal of the first battery, and a second contact configured to contact a positive terminal of the second battery, the first and second contacts extending from the lid to mate with first and second connectors of the control unit; and
   a spring disposed within the housing having a first coil configured to be in electrical communication with a positive terminal of the first battery, a second coil configured to be in electrical communication with a negative terminal of the second battery, and a connecting portion extending directly between the first and second coils of the spring for providing an electrical connection between the first and second coils of the spring.

2. The battery compartment of claim 1, wherein the housing includes a rear wall and a front wall defining an interior space configured to receive the first battery and the second battery, and the first and second contacts extend rearwardly relative to the rear wall.

3. The battery compartment of claim 2, wherein the housing is supported by the control unit such that the rear wall of the housing is juxtaposed relative to a front wall of the control unit and the first and second contacts are in electrical communication with the first and second connectors of the control unit.

4. The battery compartment of claim 1, wherein each of the first and second contacts include a body and a tab electrically connected to the body, the body coupled to the lid and including a dome configured to contact a respective one of the first and second batteries.

5. The battery compartment of claim 1, wherein the housing includes an opening to receive the hinge and configured to provide pivoting movement between the lid and the housing.

6. The battery compartment of claim 1, wherein the housing includes a grip member extending outwardly from the front wall.

7. The battery compartment of claim 1, wherein the housing includes a lower wall, and further comprising a first retention prong extending upwardly from the lower wall of the housing and operably coupled to the first coil of the spring, and a second retention prong extending upwardly from the lower wall of the housing and operably coupled to the second coil of the spring.

8. The battery compartment of claim 7, further comprising a retaining notch supported by the housing and operably coupled to the connecting portion of the spring intermediate the first and second retention prongs.

9. The battery compartment of claim 7, wherein the lower wall includes first and second access openings positioned adjacent the first and second retention prongs.

10. The battery compartment of claim 1, further comprising a latch supported by the lid and configured to releasably secure the lid to the housing.

* * * * *

UNITED STATES PATENT AND TRADEMARK OFFICE
CERTIFICATE OF CORRECTION

PATENT NO. : 7,625,667 B2 Page 1 of 1
APPLICATION NO. : 11/324901
DATED : December 1, 2009
INVENTOR(S) : Marty et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1003 days.

Signed and Sealed this

Second Day of November, 2010

David J. Kappos
*Director of the United States Patent and Trademark Office*